Nov. 20, 1923.
E. T. CURRAN
1,474,815
MOUNTING OF ILLUMINATORS OR HEADLIGHTS FOR AUTOMOBILES
Filed Aug. 16, 1920
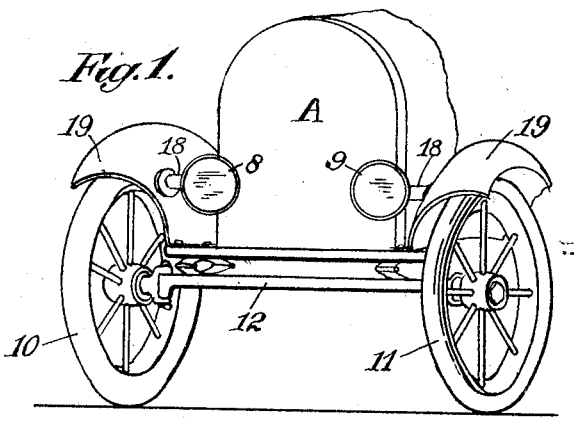
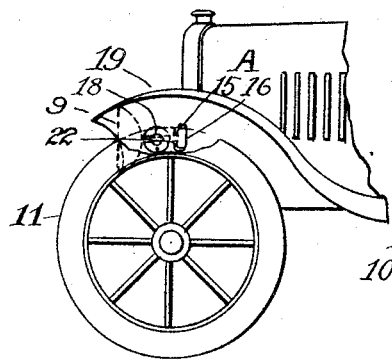
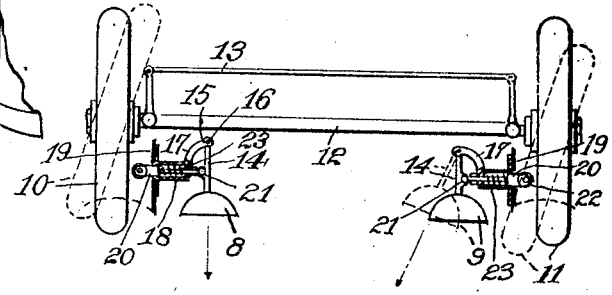
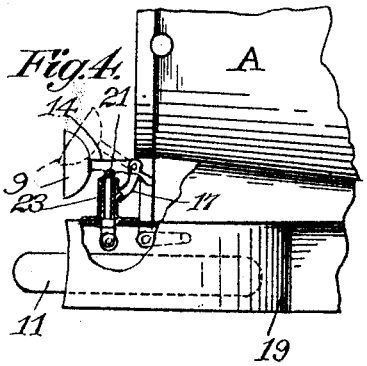
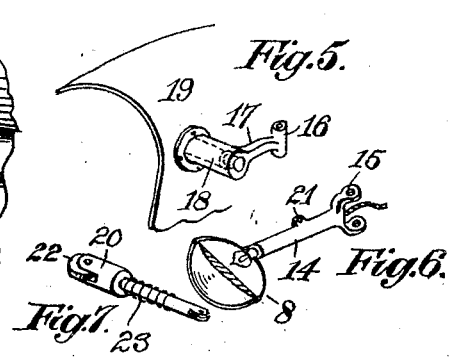
Inventor.
Edward T. Curran Patented Nov. 20, 1923.

1,474,815

UNITED STATES PATENT OFFICE.

EDWARD T. CURRAN, OF DETROIT, MICHIGAN.

MOUNTING OF ILLUMINATORS OR HEADLIGHTS FOR AUTOMOBILES.

Application filed August 16, 1920. Serial No. 403,742.

*To all whom it may concern:*

Be it known that I, EDWARD T. CURRAN, a citizen of the United States, and a resident of Detroit, in the county of Wayne and State of Michigan, have invented certain new and useful Improvements in the Mountings of Illuminators or Headlights for Automobiles, of which the following is a specification.

This invention relates to automobiles, and particularly to illuminators to illuminate the roadway during the travel of the automobile, and it is the object of the invention to provide improved illuminating means whereby as the direction of travel of the automobile is changed, or as the automobile is deflected from a straight course, to adjust an illuminator so that the light rays will lie in a plane with the deflection of the automobile.

It is a further object of the invention to provide a pair of illuminators commonly termed "headlights", and so mount and arrange the same with means to be operated by the deflection of the steering wheels of the automobile, whereby as the automobile is deflected from a straight course the illuminator at the off or outer side of the automobile is moved to position with the light rays thereof in a plane with the direction of movement of the steering wheels, while the other illuminator is maintained in position with the focus of the light rays in a plane with the longitudinal axis of the automobile.

It is another object of the invention to provide a pair of illuminators or headlights pivotally mounted at the forward end of the automobile within the steering wheels normally urged to and maintained in position with the light rays in a plane with the longitudinal axis of the automobile, and said illuminators arranged with means to be engaged by the steering wheel which is deflected inward from the longitudinal axis of the automobile as the latter is deflected from a straight course to adjust the illuminator adjacent such wheel with the light rays thereof in a plane with the deflection of the steering wheels.

In the drawing accompanying and forming a part of this specification Figure 1 is a perspective view of the forward portion of an automobile illustrating an embodiment of my improved mounting of illuminators or headlights upon the same.

Figure 2 is a side elevation of the forward part of the automobile showing my improved headlight mounting and showing the same in relation to the steering wheels.

Figure 3 is a plan view showing in a diagrammatic manner the mounting of the illuminator and the manner of adjusting one of said illuminators by an inwardly deflected steering wheel in changing the direction of travel of the automobile.

Figure 4 is a detail plan view to show the mounting of an illuminator in relation to a steering wheel.

Figure 5 is a perspective detail view of a supporting bracket for the illuminator.

Figure 6 is a detail perspective view of the pivotal support for an illuminator; and Figure 7 is a perspective view of a plunger engaged by a steering wheel to adjust an illuminator so that the light rays will project in a direction with the movement of travel of a steering wheel.

Similar characters of reference designate like parts through the different views of the drawing.

I have shown an embodiment of my invention in the drawing in which a pair of illuminators or headlights 8, 9, which may be of any conventional form, as an electric light bulb carried central of a dished reflector with a lens or crystal mounted in the opening of the reflector in front of the bulb, said illuminators being mounted at the forward end at opposite sides of the automobile (shown in a general way at A) within the space between the traction steering wheels 10, 11. These wheels are mounted upon an axle 12 to revolve on a horizontal axis and to have movement on a vertical axis to control the direction of travel of the automobile, said wheels being connected by a rod 13 (Figure 3) to impart movement to the wheels upon their vertical axes in the same direction and to substantially the same extent in changing the course or direction of movement of the automobile.

These illuminators may be mounted in various ways, and as shown are carried by tubular arms 14 attached at one end to the illuminators with the electric current conductors for the light bulb passing through the openings in said arms, the ends of the arms opposite to the connection thereof with the illuminators having a perforated bifurcation 15 to engage at opposite ends of a perforated boss 16 of an arm of a bracket 17 and mounted thereon to have movement on a vertical axis by a pin engaging in the perforations of the bifurcation and boss. The bracket 17 may be supported upon the automobile in a suitable manner and as shown are mounted by means of tubular portions 18 upon the mud guards 19 for the wheels 10, 11 to extend in a horizontal plane transversely of the automobile and with the wheel axle 12, with the openings therein in register with perforations in the guards. Plungers 20 (Figure 7) are slidably mounted in said tubular portions 18 with the ends extending transversely, the one end of the plungers having a pivotal connection, as at 21, with the illuminator supporting arms 14, and the opposite ends carrying rollers at the outer side of the guards. The plungers are normally yieldingly urged to and maintained in position by springs 23 with the illuminator carrying arms contiguous to the ends of the tubular portions of the brackets so that the light rays will lie or be directed in a plane with the longitudinal axis of the automobile, and the rollers to lie in a plane with and contiguous to the tires of the wheels 10, 11.

It is the present practice in the mounting of illuminators or headlights for automobiles to mount the same in fixed position so that the light rays will be projected in the same plane as the longitudinal axis of the automobile. In so mounting the illuminators the light rays are projected forwardly of the automobile in a line with the longitudinal axis thereof and operate efficiently while driving along a straight course or roadway. However, as the direction of travel of the automobile is changed as in turning either to the left or right the steering wheels are deflected at an angle to the axis of the automobile with the result that the light rays are not directed into the path of movement of such wheels but above and straight ahead with the result that it is impossible to see what is directly in the path of the steering wheels. By the mounting of the illuminators as described this disadvantage is obviated by automatically adjusting the illuminator at the off or outer side of the automobile from the direction in which the automobile is being driven so that the light rays of such illuminator will be in the plane with the deflection of the steering wheels and projected directly into the path of movement or travel of the inner steering wheel, and such movement of the illuminator being in the same degree as the deflection of the steering wheels whereby the driver may readily observe the condition of the roadway directly in front of such inner wheel. To automatically adjust the position of the illuminators in this manner the tire of the wheel at the off or outer side of the automobile as it is deflected inward in the direction toward the longitudinal axis of the automobile will engage the roller 23 of the plunger 20 moving the plunger inward and therewith swinging the connected illuminator on its axis to the same extent and same degree as the deflection of said wheel as clearly shown in a diagrammatic manner at the right of Figure 3. It will be noted that when the illuminator at the off side of the automobile is adjusted whether the automobile is directed toward the left or right that the other illuminator is maintained in position with the light rays in a direction longitudinally of the automobile thereby also illuminating the roadway directly in front of the automobile whereby the driver may readily observe the condition of the roadway directly in front.

Having thus described my invention I claim:

1. In an automobile, a pair of pivotally supported illuminators to have rotative adjustment on vertical axes, one independently of the other, a plunger connected to each illuminator to extend parallel with the axis of the steering wheels when the automobile is travelling in a straight course and with the ends adjacent to and in the plane of rotation of the tire of the steering wheels, and means to yieldingly maintain the illuminators in position to project the light rays in a direction longitudinally of the automobile with the plunger of the illuminator adjacent the tire of the steering wheel which is deflected inward toward the longitudinal axis of the automobile as the steering wheels are deflected in changing the direction of travel of the automobile being adapted to engage the adjacent illuminator plunger to move the connected illuminator to position to project the light rays in the direction of movement of the deflected steering wheels for the purpose specified.

2. In an automobile, a pair of illuminators pivotally supported to have movement on vertical axes with the steering wheels, a plunger connected to each of the illuminators with the end to lie contiguous to the inner side of the tires of the steering wheels and have longitudinal movement in a direction transverse to the direction of rotation of said wheels; springs to normally maintain the illuminators in position to project the light rays longitudinally of the automobile, and one of said plungers being adapted to be engaged by the tire of the steering wheel which is deflected inward toward the longitudinal axis of the automobile as the steering wheels are deflected in changing the direction of travel of the automobile to move the connected illuminator to project the light rays thereof in a direction with the direction of movement of the steering wheels, and the other illuminator maintained in the position to project the light rays in a direction longitudinally of the automobile for the purpose specified.

3. An adjustable support for headlights of automobiles, comprising an angle bracket one angle portion of which is tubular and arranged for mounting the bracket at the end upon a fixed part of the automobile and the extremity of the other angle portion of the bracket arranged to pivotally support a lamp carrier to have movement on a vertical axis, a plunger slidably mounted on the tubular portion of the bracket having one end pivotally connected to the lamp carrier exterior of the bracket, a spring within the tubular portion of the bracket to co-operate with the plunger to maintain the lamp carrier in position to extend longitudinally of the automobile, and a roller carried at the opposite end of the plunger exterior of the tubular portion of the bracket adapted to be engaged by a wheel tire in the manner and for the purpose specified.

Signed at the city of Detroit, in the county of Wayne and State of Michigan, this 6" day of August, 1920, A. D.

EDWARD T. CURRAN.